United States Patent [19]
Chou

[11] Patent Number: 5,102,155
[45] Date of Patent: Apr. 7, 1992

[54] BICYCLE WITH TWO SPEED-CHANGING MECHANISMS

[76] Inventor: Ta-Chin Chou, 75, Hua-Sheng Street, Shih-Lin, Taipei, Taiwan

[21] Appl. No.: 711,384

[22] Filed: Jun. 6, 1991

Related U.S. Application Data

[63] Continuation of Ser. No. 448,431, Dec. 11, 1989, abandoned.

[51] Int. Cl.$^5$ ............................................. B62M 9/00
[52] U.S. Cl. ................................... 280/236; 280/259; 280/261; 475/144
[58] Field of Search ............... 280/236, 259, 260, 261; 74/68, 594.1, 594.2; 475/144

[56] References Cited

U.S. PATENT DOCUMENTS

| | | | |
|---|---|---|---|
| 1,205,382 | 11/1916 | Parda | 280/261 |
| 1,360,032 | 12/1920 | Schiffner | 280/261 |
| 1,380,082 | 5/1921 | Schleder | 280/261 X |
| 1,535,714 | 4/1925 | Burke | 280/261 |
| 2,815,222 | 12/1957 | Harrison | 280/261 |
| 3,466,059 | 9/1969 | Kiernan | 280/261 |

FOREIGN PATENT DOCUMENTS

| | | | |
|---|---|---|---|
| 346953 | 9/1904 | France | 280/261 |
| 19609 | of 1896 | United Kingdom | 280/261 |
| 22244 | of 1896 | United Kingdom | 280/261 |
| 246324 | 1/1926 | United Kingdom | 280/261 |

*Primary Examiner*—Mitchell J. Hill
*Attorney, Agent, or Firm*—Lowe, Price, LeBlanc & Becker

[57] ABSTRACT

A bicycle includes a speed-increasing mechanism interposed between the driving sprocket and the driven sprocket. The speed-increasing mechanism includes a small intermediate sprocket mounted rotatably on the frame of the bicycle, a first chain trained on the driving sprocket and the small intermediate sprocket, a large intermediate sprocket connected securely and coaxially to the small intermediate sprocket, and a second chain trained on the large intermediate sprocket and the driven sprocket. The radius of the small intermediate sprocket is smaller than that of the driving sprocket, while the radius of the large intermediate sprocket is greater than that of the driven sprocket. In one embodiment, the frame includes a generally U-shaped bracket having two symmetrical, parallel, upright side walls each of which has a notch cut formed in the upper end thereof, a shaft positioned between the side walls of the bracket, two threaded holes respectively formed in two end surfaces thereof, and two lock bolts respectively extending through the notches cut of the bracket to engage with the threaded holes of the shaft so as to retain the shaft on the bracket. The large and small intermediate sprockets on same hub are journalled on the shaft.

11 Claims, 6 Drawing Sheets

BICYCLE WITH TWO SPEED-CHANGING MECHANISMS

This application is a continuation of application Ser. No. 448,431 filed Dec. 11, 1989, now abandoned.

BACKGROUND OF THE INVENTION

This invention relates to a bicycle, more particularly to a bicycle with two speed-changing sprocket-and-chain units.

Referring to FIG. 1, a know bicycle 100 includes a front wheel 11, a rear wheel 12, a large, driving sprocket 13 with a crank 16, a small, driven sprocket or freewheel 14 and a chain 15 trained on the driving sprocket 13 and the driven sprocket 14. Generally, the largest driving sprocket 13 has 54 sprocket teeth, while the smallest driven sprocket 14 has 12 sprocket teeth. When the driving sprocket 13 rotates one revolution, the driven sprocket 14 rotates 4.5 revolutions. The speed ratio of 54/12 is sufficiently large, but wastes the rider's energy.

Referring to FIG. 2, in a case where the force applied to the pedal is F1 and the length of the crank is r1, the produced moment is (M). When the crank sprocket with a radius r2 is driven by the moment (M), the force created on the chain is F2. This can be expressed by the following formula:

$$F1 \times r1 = M = F2 \times r2$$

the greater the radius r2, the greater the force F1 needed to create the same force F2, resulting in wasting more energy when propelling the bicycle. As shown in FIG. 3, a speed-changing mechanism 20 can be provided between the driving sprocket and the driven sprocket. The driving sprocket includes two sprocket members of different diameters, while the driven sprocket includes five or six sprocket members of different diameters. However, because the sprocket members of the driven sprocket do not relate to the features of this invention, further description thereof will be omitted. Although the chain 21 can be moved to engage with the teeth of a diameter-reduced driving sprocket 22 to save the rider's energy, the speed ratio of the driven sprocket 23 to the driving sprocket 22 is decreased.

SUMMARY OF THE INVENTION

It is therefore the main object of this invention to provide a bicycle in which the rear wheel can be rotated lightly and rapidly by a rider's feet.

However, in the design of the speed-changing mechanisms according to this invention, it is necessary to take into consideration how to mount the speed-changing mechanisms on the frame of the bicycle so that the speed-changing mechanisms can operate fully.

Thus, another object of this invention is to provide a mounting unit for the speed-changing mechanisms of the bicycle which permits a main part to be installed between the crank sprocket and the freewheel so that the speed-changing mechanisms can operate fully.

According to this invention, a bicycle includes a speed-changing mechanism interposed between the driving sprocket and the driven sprocket. The speed-changing mechanism includes a small intermediate sprocket mounted rotatably on the frame of the bicycle, a first chain trained on the driving sprocket and the small intermediate sprocket, a large intermediate sprocket connected securely and coaxially to the small intermediate sprocket, and a second chain trained on the large intermediate sprocket and the drive sprocket. The radius of the small intermediate sprocket is smaller than that of the driving sprocket but the radius of the driving sprocket adopted as small as possible, while the radius of the large intermediate sprocket is greater than that of the driven sprocket. In one embodiment, the frame includes a generally U-shaped bracket having two symmetrical, parallel, upright side walls each of which has a notch cut formed in the upper end thereof, a shaft positioned between the side walls of the bracket, two threaded holes respectively formed in two end surfaces of the shaft, and two lock bolts respectively extending through the notches cut of the bracket to engage with the threaded holes of the shaft so as to retain the shaft on the bracket. The large and small intermediate sprockets on same hub are journalled on the shaft.

BRIEF DESCRIPTION OF THE DRAWING

Other features and advantages of this invention will become apparent in the following detailed description of a preferred embodiment of this invention, with reference to the accompanying drawings in which.

DETAILED DESCRIPTION OF THE PREFERRED EMBODIMENT

Figure 4:
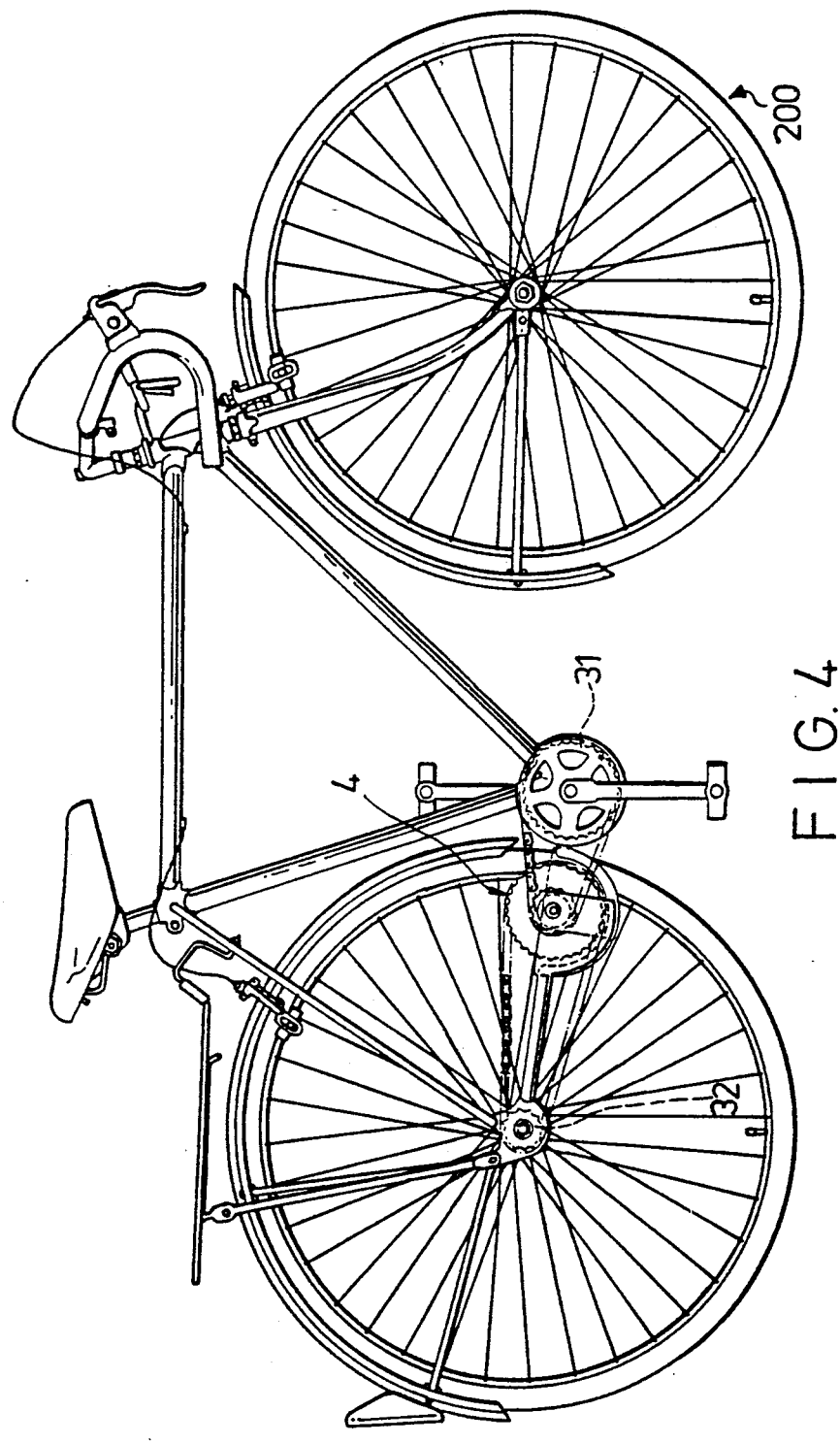
FIG. 4 is a side view of a bicycle according to this invention.
Figure 5:
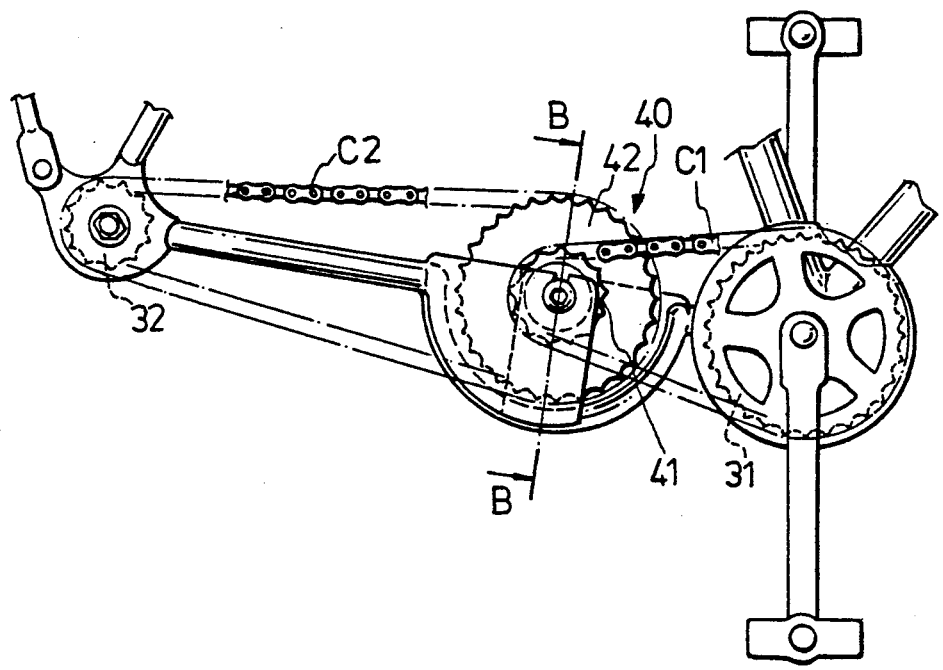
FIG. 5 is a side view showing the speed-changing mechanism of the bicycle according to this invention.
Figure 6:
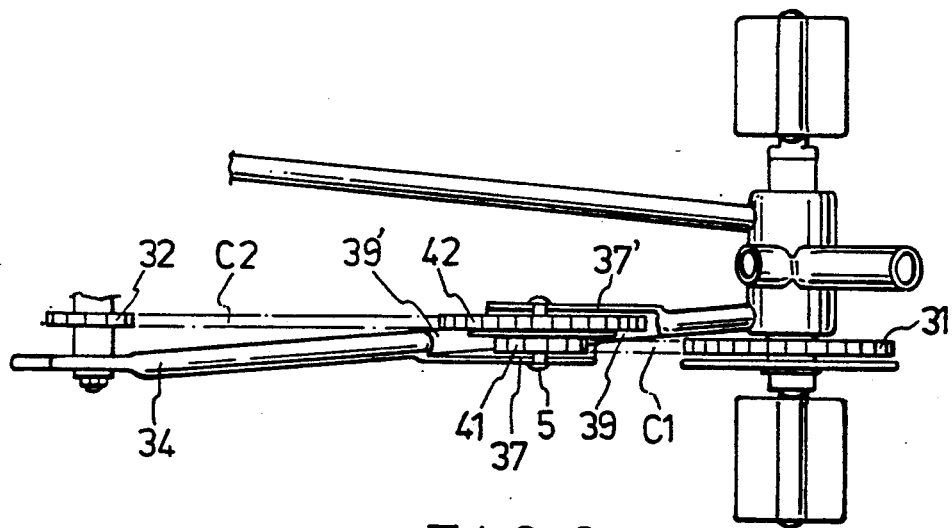
FIG. 6 is a top view showing the speed-changing mechanism of the bicycle according to this invention.

Referring to FIGS. 4-6, a bicycle of this invention includes a driving sprocket 31, a driven sprocket 32 and a speed-changing mechanism 4. The speed-changing mechanism 4 has an intermediate sprocket assembly 40 which includes a small intermediate sprocket 41 and a large intermediate sprocket 42 connected securely and coaxially to the small intermediate sprocket 41.

Figure 7:
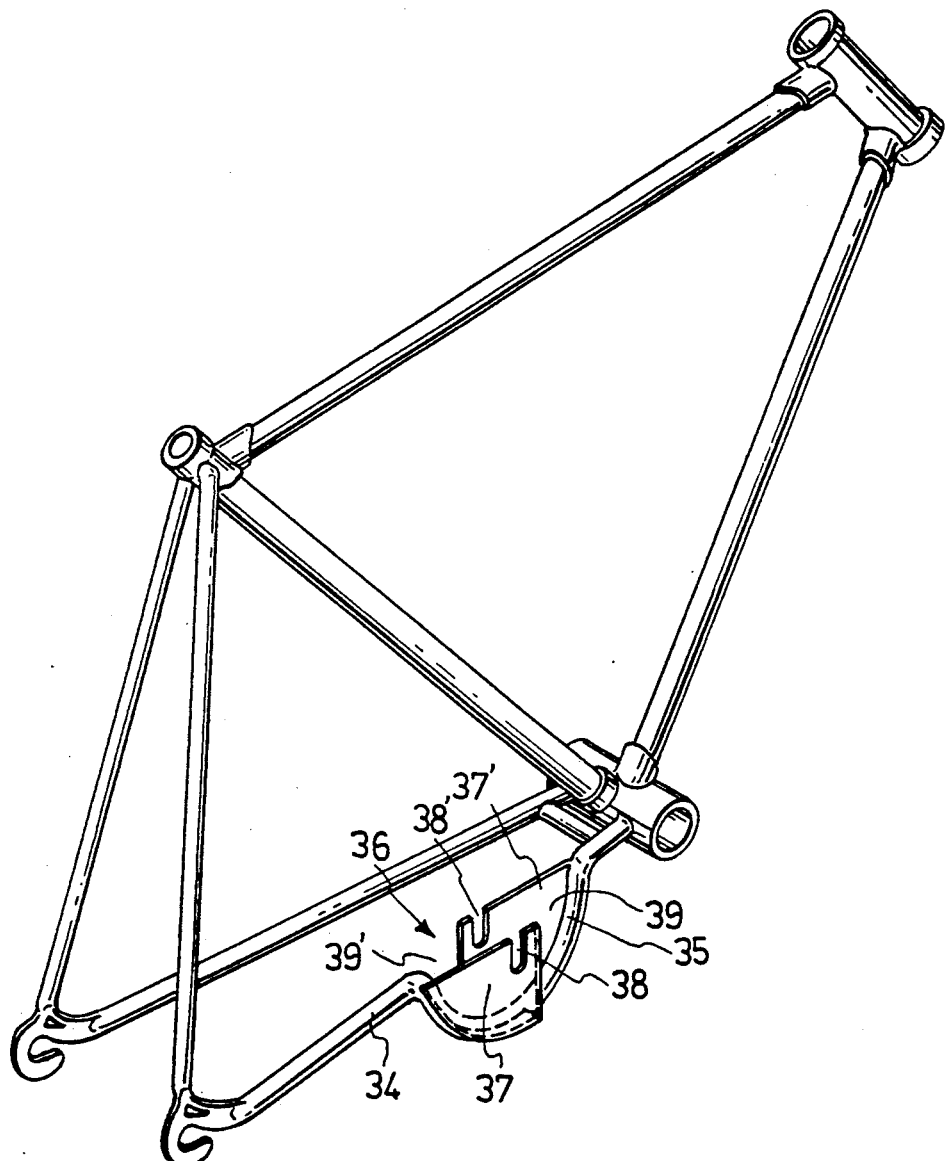
FIG. 7 is a perspective view showing the frame of the bicycle according to this invention.
Figure 8:
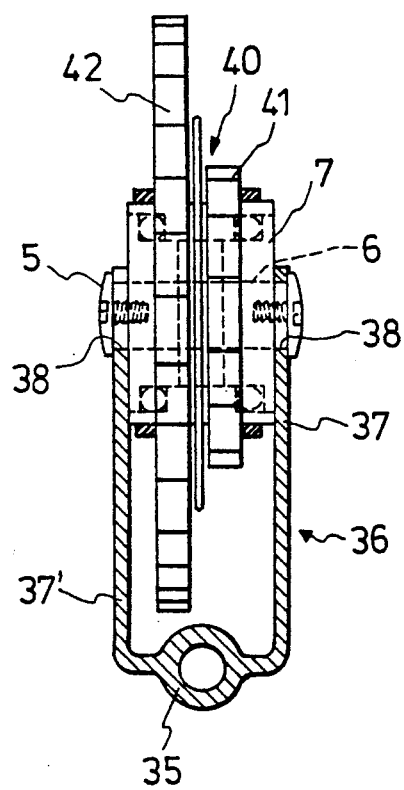
FIG. 8 is a sectional view taken along Line 8—8 in FIG. 5.

As shown in FIGS. 7 and 8, the frame of the bicycle 200 includes a chain stay 34 having an arcuated portion 35 at which a generally U-shaped bracket 36 is formed. The bracket 36 includes two symmetrical, parallel, upright side walls 37, 37' which have notch cuts 38, 38' formed in the upper ends thereof. Two bolts 5 respectively extend through the notch cuts 38, 38' of the bracket 36 to engage with the threaded holes of a shaft 6 which is positioned between the side walls 37, 37' of the bracket 36. Accordingly, the shaft 6 is retained on the bracket 36. The intermediate sprocket assembly 40 is journalled on the shaft 6 by two bearings 7.

A first chain (C1) is trained on the driving sprocket 31 and the small intermediate sprocket 41, while a second chain (C2) is trained on the large intermediate sprocket 42 and the driven sprocket 32. As illustrated, the symmetrical, parallel side walls 37, 37' of the bracket 36 are generally shaped in the form of a quarter circle and are respectively connected to rear and front portions of the bracket 36 so that two openings 39, 39' are formed in the front and rear ends of the bracket 36, with a result that the chains (C1, C2) can pass through the openings 39, 39' of the bracket 36. As will be appreciated from FIGS. 5 and 7, the two side walls are not co-extensive. A front segment of the arcuate portion 35 of the bracket 36 is connected to only one of the upright side walls (37'), while a rear segment of arcuate portion 35 is connected only to the other side wall (37), thus forming the front and rear openings 39 and 39'. Moreover, the radius of curvature of arcuate portion 35 is greater than that of the large intermediate sprocket 42, thus permitting installation of the intermediate sprocket assembly with chains C1 and C2 entrained thereon, with chain C2 passing through rear opening 39' and chain C1 passing through front opening 39.

Because the radius of the small intermediate sprocket 41 is much smaller than that of the driving sprocket 31 and the radius of the large intermediate sprocket 42 is much greater than that of the driven sprocket 32, so the rear wheel of the bicycle 200 can rotate at a speed which is the product of the two sets of the sprocket teeth ratios times the rotational speed of the driving sprocket 31. Furthermore, because the radius of the driving sprocket 31 is almost ½ smaller than that of a conventional bicycle, the pedals of the bicycle can be easily rotated by a rider's feet so that the bicycle of this invention has the advantage of saving energy.

Figure 1:
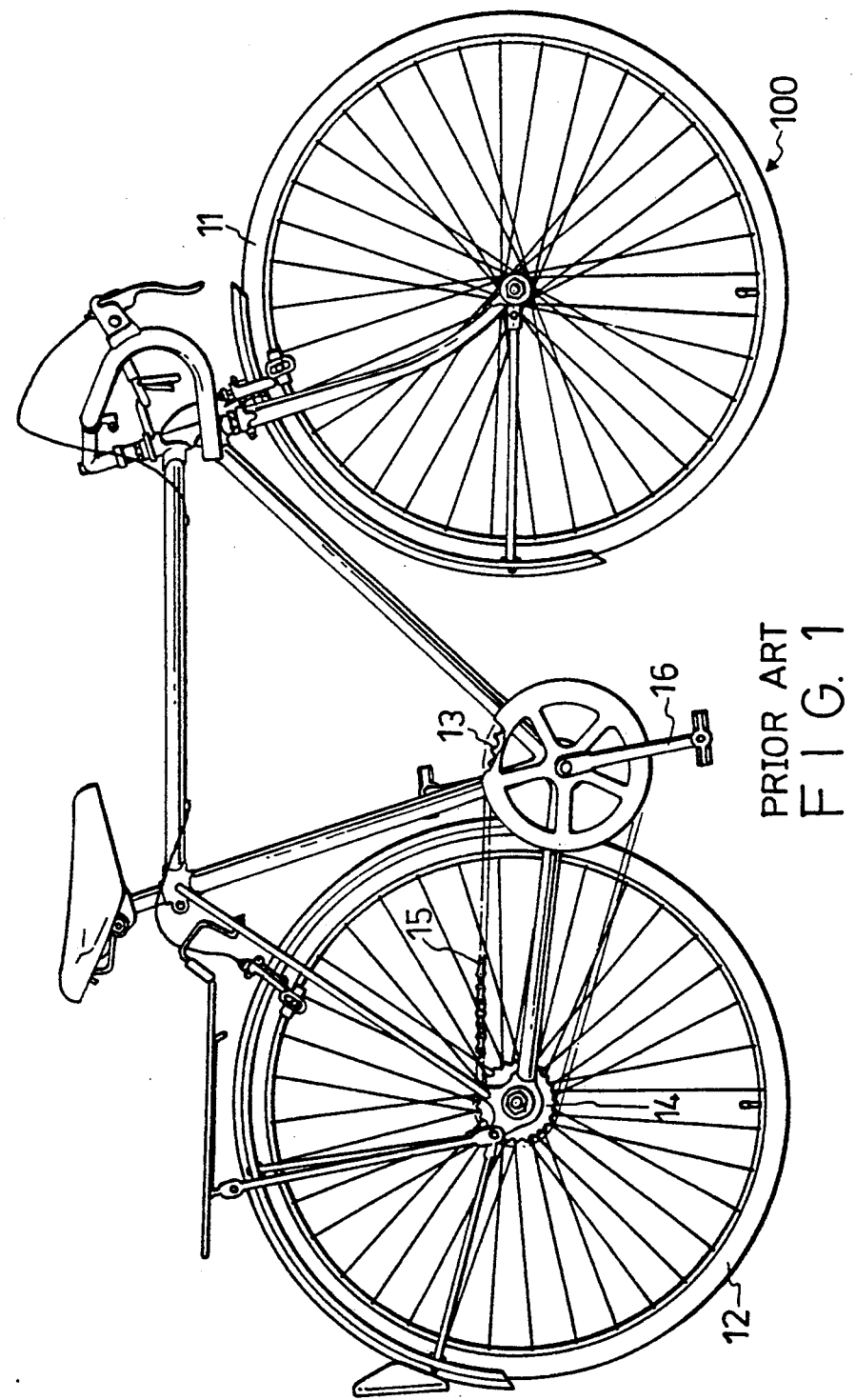
FIG. 1 is a side view of a conventional bicycle.
Figure 2:
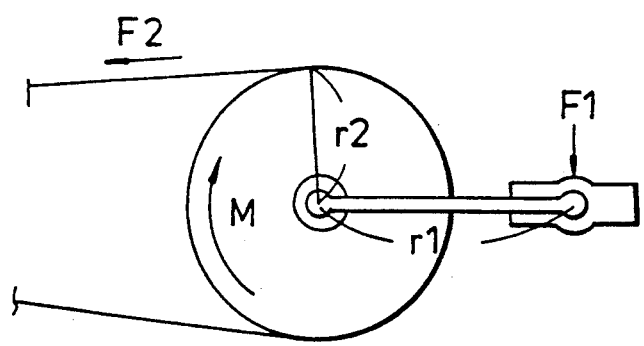
FIG. 2 is a schematic view illustrating the reason of saving energy in accordance with this invention.
Figure 3:
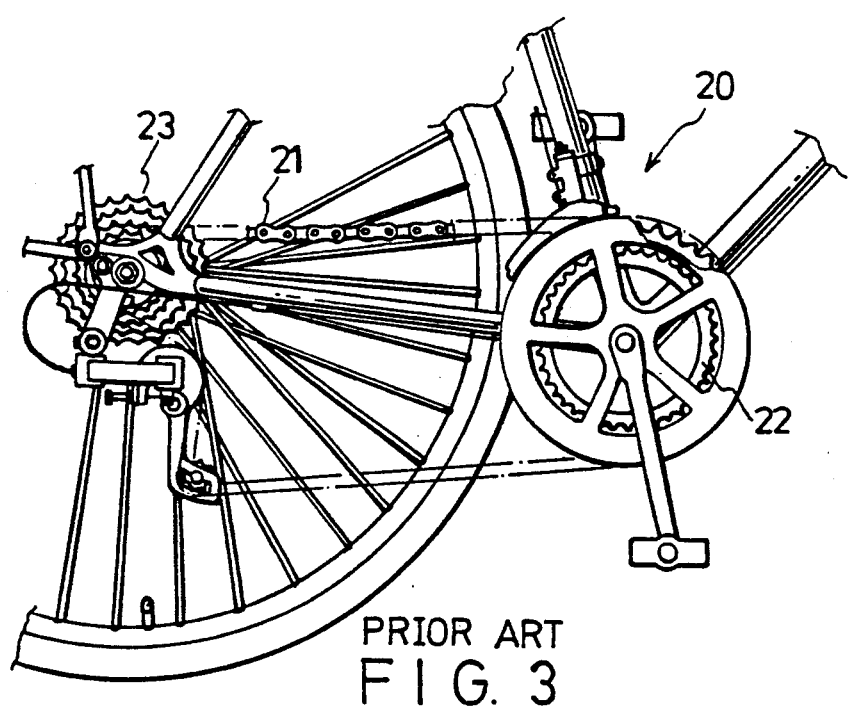
FIG. 3 is a side view showing the speed-changing mechanism of a conventional bicycle.

In this embodiment, the number of sprocket teeth of the driving sprocket 31, the small intermediate sprocket 41, the large intermediate sprocket 42 and the driven sprocket 32 are 28, 13, 28 and 12, respectively. When the driving sprocket 31 rotates one revolution, the driven sprocket 32 rotates equally to $28/13 \times 28/12 = 5$ revolutions. In comparison with the conventional bicycle shown in FIGS. 1 and 3, the rotational speed ratio of the driven sprocket to the driving sprocket of a bicycle is increased in accordance with this invention. Furthermore, because the radius of the driving sprocket 31 is almost ½ smaller than that of the conventional bicycle shown in FIGS. 1 and 3, the pedals of the bicycle can be lightly pedaled by a rider's feet.

With this invention thus explained, it is apparent that numerous modifications and variations can be made without departing from the scope and spirit of this invention. It is therefore intended that this invention be limited only as indicated in the appended claims.

I claim:

1. A bicycle including a frame, a front wheel, a rear wheel, a driving sprocket and a driven sprocket, said driven sprocket being capable of being driven by said driving sprocket to rotate said rear wheel, characterized by a speed-changing mechanism interposed between said driving sprocket and said driven sprocket, said speed-changing mechanism including a small intermediate sprocket mounted rotatably on said frame, a first chain trained on said driving sprocket and said small intermediate sprocket, a large intermediate sprocket connected securely and coaxially to said small intermediate sprocket, and a second chain trained on said large intermediate sprocket and said driven sprocket, said small intermediate sprocket having a radius which is smaller than that of said driving sprocket, said large intermediate sprocket having a radius which is greater than that of said driven sprocket,
wherein said frame includes a generally U-shaped, open, bracket having two symmetrical, parallel, upright side walls each of which has a notch cut in an upper end thereof, and a shaft journalled between said side walls of said bracket, said large and small intermediate sprockets of same hub being journalled on said shaft.
wherein said symmetrical, parallel, side walls of said bracket are each generally shaped in the form of a portion of a circle, a front portion of said U-shaped bracket connected to only one of said two side walls and a rear portion of said U-shaped bracket connected only to the other of said two side walls, thereby to provide front and rear openings in said bracket for passage of said first and second chains therethrough.

2. A bicycle as claimed in claim 1, wherein said frame includes a chain stay, said chain stay including an arcuate portion therein, said U-shaped bracket comprising said arcuate portion of said chain stay.

3. A bicycle as claimed in claim 1, wherein said U-shaped bracket has a radius which is greater than the radius of said large intermediate sprocket.

4. A bicycle as recited in claim 3 wherein said side wall each comprises substantially a quarter circle, each said quarter circle attached at a circular portion thereof to said U-shaped bracket,
thereby enabling a sprocket assembly to be mounted on said frame after entraining a chain on the sprocket assembly.

5. A bicycle including a frame, a front wheel, a rear wheel, a driving sprocket and a driven sprocket, said driven sprocket being capable of being driven by said driving sprocket to rotate said rear wheel, characterized by a speed-changing mechanism interposed between said driving sprocket and said driven sprocket, said speed-changing mechanism including a small intermediate sprocket mounted rotatably on said frame, a first chain trained on said driving sprocket and said small intermediate sprocket, a large intermediate sprocket connected securely and coaxially to said small intermediate sprocket, and a second chain trained on said large intermediate sprocket and said driven sprocket, said small intermediate sprocket having a radius which is smaller than that of said driving sprocket, said large intermediate sprocket having a radius which is greater than that of said driven sprocket, wherein said frame includes a generally U-shaped bracket having two symmetrical, parallel, upright side walls each of which has a notch cut in an upper end thereof, and a shaft journalled between said side walls of said bracket, said large and small intermediate sprockets on same hub being journalled on said shaft,
wherein said symmetrical, parallel, side walls of said bracket are generally shaped in the form of a portion of a circle, a front portion of said U-shaped bracket connected to only one of said two side walls and a rear portion of said U-shaped bracket connected only to the other of said two side walls, thereby forming two openings in front and rear ends of said bracket, whereby, said first and second chains can respectively pass through said openings of said bracket.

6. A bicycle as claimed in claim 5, wherein said symmetrical, parallel, side walls of said bracket are respectively parallel to said driving sprocket and said driven sprocket.

7. A bicycle as claimed in claim 5, wherein said parallel side walls of said U-shaped bracket each further include a flat arcuate portion, forming a U-shaped structural member of said bracket.

8. A bicycle as recited in claim 5 wherein said side walls each comprises substantially a quarter circle, each said quarter circle attached at a circular portion thereof to said U-shaped bracket,
thereby enabling a sprocket assembly to be mounted on said frame after entraining a chain on the sprocket assembly.

9. A bicycle as recited in claim 5 wherein said U-shaped bracket has a radius which is greater than the radius of said large intermediate sprocket.

10. A bicycle including a frame, a front wheel, a rear wheel, a driving sprocket and a driven sprocket, said driven sprocket being capable of being driven by said driving sprocket to rotate said rear wheel, characterized by a speed-changing mechanism interposed between said driving sprocket and said driven sprocket, said speed-changing mechanism including a small intermediate sprocket mounted rotatably on said frame, a first chain trained on said driving sprocket and said small intermediate sprocket, a large intermediate sprocket connected securely and coaxially to said small intermediate sprocket, and a second chain trained on said large intermediate sprocket and said driven sprocket, said small intermediate sprocket having a radius which is smaller than that of said driving sprocket, said large intermediate sprocket having a radius which is greater than that of said driven sprocket,
wherein said frame includes a generally U-shaped, open, bracket having two symmetrical, parallel, upright side walls each of which has a notch cut in an upper end thereof, and a shaft journalled between said side walls of said bracket, said large and small intermediate sprockets on same hub being journalled on said shaft,
wherein said symmetrical, parallel, side walls of said bracket are generally shaped in the form of a portion of a circle, a front portion of said U-shaped bracket connected to only one of said two side walls and a rear portion of said U-shaped bracket connected only to the other of said two side walls, thereby to provide front and rear openings in said bracket for passage of said first and second chains therethrough and are respectively parallel to said driving sprocket and said driven sprocket.

11. A bicycle as recited in claim 10 wherein said U-shaped bracket has a radius which is greater than the radius of said large intermediate sprocket.

* * * * *